(12) United States Patent
de Vries et al.

(10) Patent No.: US 12,340,118 B2
(45) Date of Patent: Jun. 24, 2025

(54) SYSTEMS, METHODS, AND MEDIA FOR PRIORITIZING READ ACCESSES TO STORAGE DEVICES

(71) Applicant: SK hynix NAND Product Solutions Corp., San Jose, CA (US)

(72) Inventors: Jonathan de Vries, Folsom, CA (US); Neelesh Vemula, Santa Clara, CA (US)

(73) Assignee: SK hynix NAND Product Solutions Corp., Rancho Cordova, CA (US)

( * ) Notice: Subject to any disclaimer, the term of this patent is extended or adjusted under 35 U.S.C. 154(b) by 21 days.

(21) Appl. No.: 17/977,975

(22) Filed: Oct. 31, 2022

(65) Prior Publication Data

US 2024/0143224 A1 May 2, 2024

(51) Int. Cl.
G06F 3/06 (2006.01)

(52) U.S. Cl.
CPC .......... *G06F 3/0659* (2013.01); *G06F 3/0679* (2013.01); *G06F 3/0604* (2013.01)

(58) Field of Classification Search
CPC .... G06F 3/0659; G06F 3/0679; G06F 3/0604; G06F 3/061; G06F 3/0653; G06F 13/18; G06F 13/1605; G06F 13/1668
See application file for complete search history.

(56) References Cited

U.S. PATENT DOCUMENTS

| 7,555,621 | B1 | 6/2009 | Pavlyushchik |
| 9,213,637 | B1 | 12/2015 | Karamcheti et al. |
| 10,860,388 | B1 * | 12/2020 | Ozturk .................. G06F 3/0659 |
| 11,314,436 | B1 | 4/2022 | Gahlot et al. |
| 2003/0023815 | A1 | 1/2003 | Yoneyama et al. |
| 2003/0167385 | A1 | 9/2003 | Lai et al. |
| 2010/0180006 | A1 | 7/2010 | Nourbakhsh et al. |
| 2013/0282962 | A1 | 10/2013 | Rub et al. |
| 2014/0281260 | A1 | 9/2014 | Peterson et al. |

(Continued)

FOREIGN PATENT DOCUMENTS

JP 2014013587 1/2014

OTHER PUBLICATIONS

International Search Report and Written Opinion dated Jan. 22, 2024 in International Patent Application No. PCT/US2023/033396, pp. 1-8.

(Continued)

*Primary Examiner* — Rocio Del Mar Perez-Velez
*Assistant Examiner* — Tong B. Vo
(74) *Attorney, Agent, or Firm* — Byrne Poh LLP (57) ABSTRACT

Mechanisms for prioritizing read commands over write commands to a storage device are provided, the mechanisms comprising: determining counts of read commands targeting a plurality of portions of the storage device; calculating a threshold based on a function of an average of the counts of read commands targeting the plurality of portions of the storage device; determining that a count of read command(s) targeting one of the plurality of portions of the storage device meets the threshold; and in response to determining that the count of read command(s) targeting the one of the plurality of portions of the storage device meets the threshold, prioritizing a read command to access the one of the plurality of portions of the storage device over at least one write command.

24 Claims, 6 Drawing Sheets

(56) References Cited

U.S. PATENT DOCUMENTS

| | | | |
|---|---|---|---|
| 2014/0325164 A1* | 10/2014 | Thompson | G06F 3/0611 |
| | | | 711/154 |
| 2016/0187959 A1 | 6/2016 | Nagarajan et al. | |
| 2017/0358346 A1 | 12/2017 | Zhang et al. | |
| 2018/0232178 A1 | 8/2018 | Iwaki et al. | |
| 2020/0133585 A1* | 4/2020 | Muchherla | G06F 3/0679 |
| 2021/0042233 A1 | 2/2021 | Lee et al. | |
| 2021/0303340 A1 | 9/2021 | Li et al. | |
| 2022/0222013 A1 | 7/2022 | Shveidel et al. | |
| 2022/0246187 A1 | 8/2022 | Shiraishi | |
| 2022/0270655 A1 | 8/2022 | Ochiai | |
| 2023/0062167 A1 | 3/2023 | Agarwal et al. | |
| 2023/0229590 A1* | 7/2023 | Bi | G06F 12/0292 |
| | | | 711/154 |
| 2023/0236758 A1* | 7/2023 | Del Gatto | G06F 3/0653 |
| | | | 711/154 |

OTHER PUBLICATIONS

International Search Report and Written Opinion dated Feb. 19, 2024 in International Patent Application No. PCT/US2023/035862, pp. 1-9.

Office Action dated Feb. 22, 2024 in U.S. Appl. No. 17/949,378, pp. 1-22.

* cited by examiner

SYSTEMS, METHODS, AND MEDIA FOR PRIORITIZING READ ACCESSES TO STORAGE DEVICES

BACKGROUND

Modern computing devices, which can include general and special purpose computers such as desktop computers, laptop computers, tablet computers, servers, mobile phones, Internet of Things (IoT) devices, among many others, frequently implement different processes (which can be referred to herein as "workers") that read and/or write information (which can include data and/or programs) to and/or from one or more storage devices, such as solid-state drives. In order to ensure that each worker receives a desired amount of access to the storage device(s), such modern computing devices can allocate a share to each worker that defines the amount of access each worker has to the storage device(s), or a portion thereof. For example, a share amount can indicate a percentage of time that a worker is to have access to a storage device, or a portion of the storage device. As a more particular example, for a computing device with three workers, worker 1 could be allocated a share of 50% (or any other suitable percentage between 0% and 100%), worker 2 could be allocated a share of 30% (or any other suitable percentage between 0% and 100%), and worker 3 could be allocated a share of 20% (or any other suitable percentage between 0% and 100%). In this scenario, on average, over long periods of time, worker 1 would be able to access the storage device, or a portion thereof, for approximately 50% of the total time the storage is accessed, and workers 2 and 3 would similarly have access times approximately equal to 30% and 20%, respectively.

In some instances, maintaining shares for workers can cause storage devices to violate quality of service (QoS) requirements. For example, if a storage device is processing many write accesses to a storage device (which tend to be longer in time compared to read accesses) for one worker, the QoS for a worker needing read accesses may fall below the specified performance requirements for the storage device.

Accordingly, new mechanisms for prioritizing read accesses to storage devices are desirable.

SUMMARY

In accordance with some embodiments, mechanisms (which can include systems, methods, and media) for prioritizing read accesses to storage devices are provided.

In some embodiments, systems for prioritizing read commands over write commands to a storage device are provided, the systems comprising: memory; and at least one hardware processor that is coupled to the memory and that is collectively configured to at least: determine counts of read commands targeting a plurality of portions of the storage device; calculate a threshold based on a function of an average of the counts of read commands targeting the plurality of portions of the storage device; determine that a count of read command(s) targeting one of the plurality of portions of the storage device meets the threshold; and in response to determining that the count of read command(s) targeting the one of the plurality of portions of the storage device meets the threshold, prioritize a read command to access the one of the plurality of portions of the storage device over at least one write command. In some of these embodiments, the counts of commands targeting the plurality of portions of the storage device are counts of read commands targeting the plurality of portions of the storage device. In some of these embodiments, the plurality of portions of the storage device are NAND devices. In some of these embodiments, the storage device is a solid-state drive. In some of these embodiments, the function of the average of the counts of the read commands targeting the plurality of portions of the storage device is a function of $\alpha \cdot \langle N_{read}[i] \rangle + \beta$, where $\langle N_{read}[i] \rangle$ is the average of the counts of the read commands targeting the plurality of portions of the storage device, and $\alpha$ and $\beta$ are control parameters. In some of these embodiments, the function of the average of the counts of the read commands targeting the plurality of portions of the storage device is floor($\alpha \cdot \langle N_{read}[i] \rangle + \beta$), where $\langle N_{read}[i] \rangle$ is the average of the counts of the read commands targeting the plurality of portions of the storage device, and $\alpha$ and $\beta$ are control parameters. In some of these embodiments, the determining that the count of read command(s) targeting the one of the plurality of portions of the storage device meets the threshold comprises determining that the count of read command(s) targeting the one of the plurality of portions of the storage device is greater than the threshold. In some of these embodiments, the determining that the count of read command(s) targeting the one of the plurality of portions of the storage device meets the threshold comprises determining that the count of read command(s) targeting the one of the plurality of portions of the storage device is greater than or equal to the threshold.

In some embodiments, methods for prioritizing read commands over write commands to a storage device are provided, the methods comprising: determining counts of read commands targeting a plurality of portions of the storage device; calculating a threshold based on a function of an average of the counts of read commands targeting the plurality of portions of the storage device; determining that a count of read command(s) targeting one of the plurality of portions of the storage device meets the threshold; and in response to determining that the count of read command(s) targeting the one of the plurality of portions of the storage device meets the threshold, prioritizing a read command to access the one of the plurality of portions of the storage device over at least one write command. In some of these embodiments, the counts of commands targeting the plurality of portions of the storage device are counts of read commands targeting the plurality of portions of the storage device. In some of these embodiments, the plurality of portions of the storage device are NAND devices. In some of these embodiments, the storage device is a solid-state drive. In some of these embodiments, the function of the average of the counts of the read commands targeting the plurality of portions of the storage device is a function of $\alpha \cdot \langle N_{read}[i] \rangle + \beta$, where $\langle N_{read}[i] \rangle$ is the average of the counts of the read commands targeting the plurality of portions of the storage device, and $\alpha$ and $\beta$ are control parameters. In some of these embodiments, the function of the average of the counts of the read commands targeting the plurality of portions of the storage device is floor ($\alpha \cdot \langle N_{read}[i] \rangle + \beta$), where $\langle N_{read}[i] \rangle$ is the average of the counts of the read commands targeting the plurality of portions of the storage device, and $\alpha$ and $\beta$ are control parameters. In some of these embodiments, the determining that the count of read command(s) targeting the one of the plurality of portions of the storage device meets the threshold comprises determining that the count of read command(s) targeting the one of the plurality of portions of the storage device is greater than the threshold. In some of these embodiments, the determining that the count of read command(s) targeting the one of the plurality of portions of the storage device meets the threshold comprises determining that the count of read command(s) targeting the one of the plurality of portions of the storage device is greater than or equal to the threshold.

In some embodiments, non-transitory computer-readable media containing computer executable instructions that, when executed by a processor, cause the processor to perform a method for prioritizing read commands over write commands to a storage device are provided, the method comprising: determining counts of read commands targeting a plurality of portions of the storage device; calculating a threshold based on a function of an average of the counts of read commands targeting the plurality of portions of the storage device; determining that a count of read command(s) targeting one of the plurality of portions of the storage device meets the threshold; and in response to determining that the count of read command(s) targeting the one of the plurality of portions of the storage device meets the threshold, prioritizing a read command to access the one of the plurality of portions of the storage device over at least one write command. In some of these embodiments, the counts of commands targeting the plurality of portions of the storage device are counts of read commands targeting the plurality of portions of the storage device. In some of these embodiments, the plurality of portions of the storage device are NAND devices. In some of these embodiments, the storage device is a solid-state drive. In some of these embodiments, the function of the average of the counts of the read commands targeting the plurality of portions of the storage device is a function of $\alpha \cdot <N_{read}[i]> + \beta$, where $<N_{read}[i]>$ is the average of the counts of the read commands targeting the plurality of portions of the storage device, and $\alpha$ and $\beta$ are control parameters. In some of these embodiments, the function of the average of the counts of the read commands targeting the plurality of portions of the storage device is floor($\alpha \cdot <N_{read}[i]> + \beta$), where $<N_{read}[i]>$ is the average of the counts of the read commands targeting the plurality of portions of the storage device, and $\alpha$ and $\beta$ are control parameters. In some of these embodiments, the determining that the count of read command(s) targeting the one of the plurality of portions of the storage device meets the threshold comprises determining that the count of read command(s) targeting the one of the plurality of portions of the storage device is greater than the threshold. In some of these embodiments, the determining that the count of read command(s) targeting the one of the plurality of portions of the storage device meets the threshold comprises determining that the count of read command(s) targeting the one of the plurality of portions of the storage device is greater than or equal to the threshold.

DETAILED DESCRIPTION

In accordance with some embodiments, mechanisms (which can include systems, methods, and media) for prioritizing read accesses to storage devices are provided.

As described herein, in some embodiments, these mechanisms can prioritize read commands ahead of write commands to any suitable part or whole (the part or whole being referred to herein as a "portion") of any suitable one or more storage devices. For example, in a NAND solid state drive (SSD), there may be multiple NAND dies (which may each be referred to herein as a "NAND") and one or more, or all, of these NAND dies may be referred to herein as a portion of the NAND SSD, in some embodiments. Likewise, when multiple SSDs are being used, a portion of the SSDs could be one, two, any suitable subset, or all of the SSDs.

In some embodiments, the mechanisms described herein can track the number of incomplete read and write commands targeting each portion i of a storage device. Then, the mechanisms can calculate a threshold that, when exceeded by the number of read commands for a portion of the storage device, is used to prioritize read commands for that portion of the storage. In some embodiments, this threshold can be calculated as:

$$T_i = \text{floor}(\alpha \cdot <N_{read}[i]> + \beta)$$

where: floor( ) returns the greatest integer less than or equal to a real input value; $<N_{read}[i]>$ is the average number of incomplete read commands across all portions (e.g., NANDs) of the storage device; and $\alpha$ and $\beta$ are calibration parameters that can be determined heuristically based on a desired aggressiveness of the mechanisms in prioritizing read commands. Next, the mechanisms can compare the number of incomplete read commands for a portion of the storage device to the threshold. If this number meets (e.g., is greater than or greater than or equal to) the threshold, the mechanisms can prioritize a read command for processing ahead of one or more write commands for that portion of the storage device. Otherwise, the mechanisms can follow a share policy to decide which command to process next.

Figure 1:
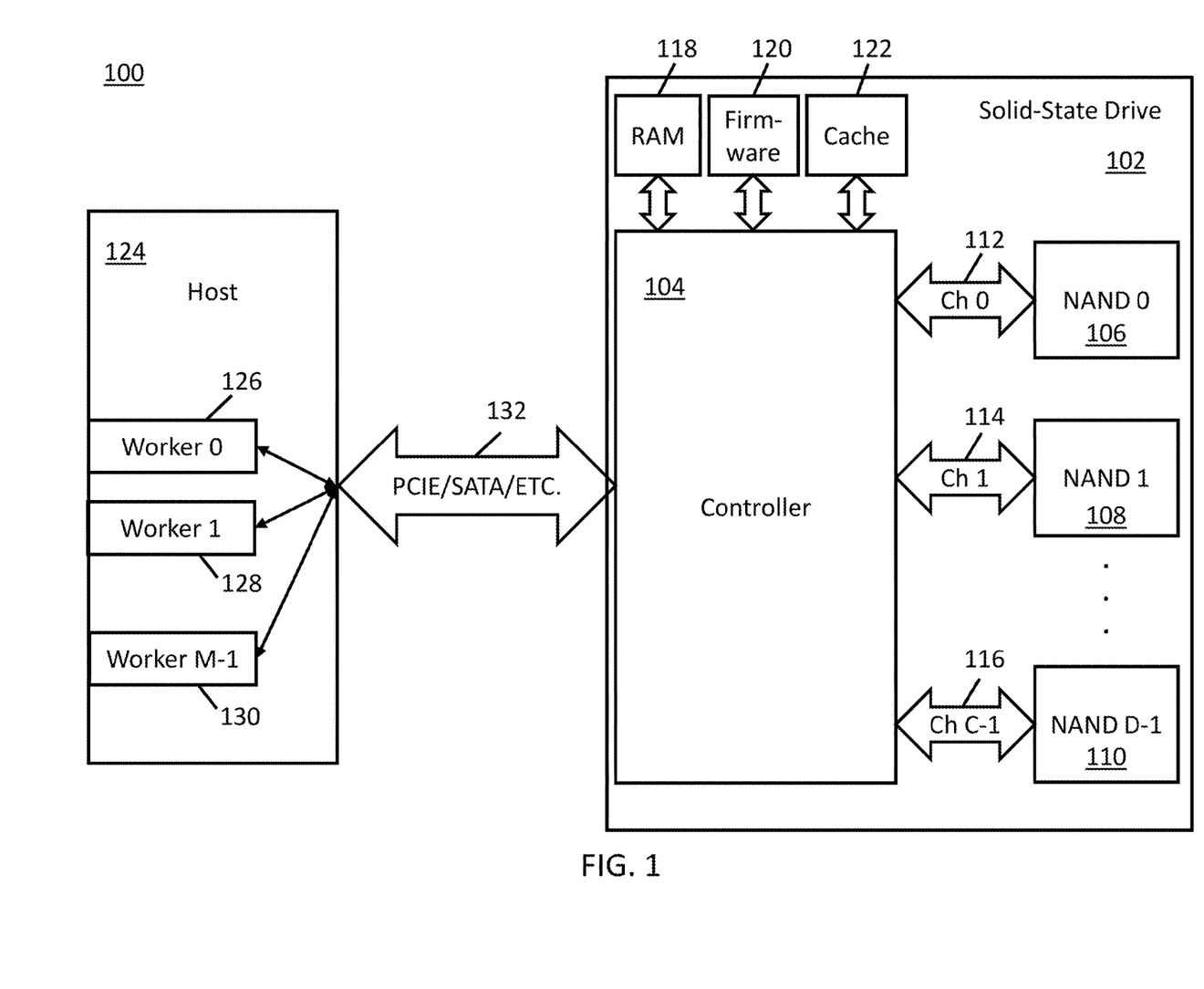
FIG. 1 is an example of block diagram of a solid-state drive coupled to a host device via a bus in accordance with some embodiments.

Turning to FIG. 1, an example block diagram of a solid-state drive 102 coupled to a host device 124 via a bus 132 in accordance with some embodiments is illustrated.

As shown, solid-state drive 102 can include a controller 104, NAND devices 106, 108, and 110, channels 112, 114, and 116, random access memory (RAM) 118, firmware 120, and cache 122 in some embodiments. In some embodiments, more or fewer components than shown in FIG. 1 can be included. In some embodiments, two or more components shown in FIG. 1 can be included in one component.

Controller 104 can be any suitable controller for a solid-state drive in some embodiments. In some embodiments, controller 104 can include any suitable hardware processor(s) (such as a microprocessor, a digital signal processor, a microcontroller, a programmable gate array, etc.). In some embodiments, controller 104 can also include any suitable memory (such as RAM, firmware, cache, buffers, latches, etc.), interface controller(s), interface logic, drivers, etc.

NAND devices 106, 108, and 110 can be any suitable NAND devices for storing information (which can include data, programs, and/or any other suitable information that can be stored in a solid-state drive) in some embodiments. The NAND devices can include any suitable memory cells, hardware processor(s) (such as a microprocessor, a digital signal processor, a microcontroller, a programmable gate array, etc.), interface controller(s), interface logic, drivers, etc. in some embodiments. While three NAND devices (106, 108, and 110) are shown in FIG. 1, any suitable number D of NAND devices (including only one) can be used in some embodiments. Any suitable type of NAND devices (such as single-level cell (SLC), multilevel cell (MLC), triple-level cell (TLC), quad-level cell (QLC), 3D NAND, etc.) can be used in some embodiments. Each NAND device can have any suitable size in some embodiments. While devices 106, 108, and 110 are described herein as being NAND devices, the devices can additionally or alternatively use any other suitable storage technology or technologies, such as NOR flash memory or any other suitable flash technology, phase change memory technology, and/or other any other suitable non-volatile memory storage technology.

Channels 112, 114, and 116 can be any suitable mechanism for communicating information between controller 104 and NAND devices 106, 108, and 110 in some embodiments. For example, the channels can be implemented using conductors (lands) on a circuit board in some embodiments. While three channels (112, 114, and 116) are shown in FIG. 1, any suitable number C of channels can be used in some embodiments.

Random access memory (RAM) 118 can include any suitable type of RAM, such as dynamic RAM, static RAM, etc., in some embodiments. Any suitable number of RAM 118 can be included, and each RAM 118 can have any suitable size, in some embodiments.

Firmware 120 can include any suitable combination of software and hardware in some embodiments. For example, firmware 120 can include software programmed in any suitable programmable read only memory (PROM) in some embodiments. Any suitable number of firmware 120, each having any suitable size, can be used in some embodiments.

Cache 122 can be any suitable device for temporarily storing information (which can include data and programs in some embodiments), in some embodiments. Cache 122 can be implemented using any suitable type of device, such as RAM (e.g., static RAM, dynamic RAM, etc.) in some embodiments. Any suitable number of cache 122, each having any suitable size, can be used in some embodiments.

Host device 124 can be any suitable device that accesses stored information in some embodiments. For example, in some embodiment, host device 124 can be a general-purpose computer, a special-purpose computer, a desktop computer, a laptop computer, a tablet computer, a server, a database, a router, a gateway, a switch, a mobile phone, a communication device, an entertainment system (e.g., an automobile entertainment system, a television, a set-top box, a music player, etc.), a navigation system, etc. While only one host device 124 is shown in FIG. 1, any suitable number of host devices can be included in some embodiments.

In some embodiments, host device 124 can include workers 126, 128, and 130. While three workers (126, 128, and 130) are shown in FIG. 1, any suitable number of workers M can be included in some embodiments. In some embodiments, at least two workers can be included. A worker can be any suitable hardware and/or software that reads and/or writes data from and/or to solid-state drive 102.

Bus 132 can be any suitable bus for communicating information (which can include data and/or programs in some embodiments), in some embodiments. For example, in some embodiments, bus 132 can be a PCIE bus, a SATA bus, or any other suitable bus.

Although FIG. 1 illustrates a NAND solid-state drive, it should be understood that the mechanisms described herein can be used with other forms of storage and/or other devices. For example, in some embodiments, the mechanisms can be used with network nodes in routing, compute nodes, and/or any suitable device to which multiple workers require access, and their access is controlled by shares that are determined with a QoS bypass mechanism.

Figure 2A:
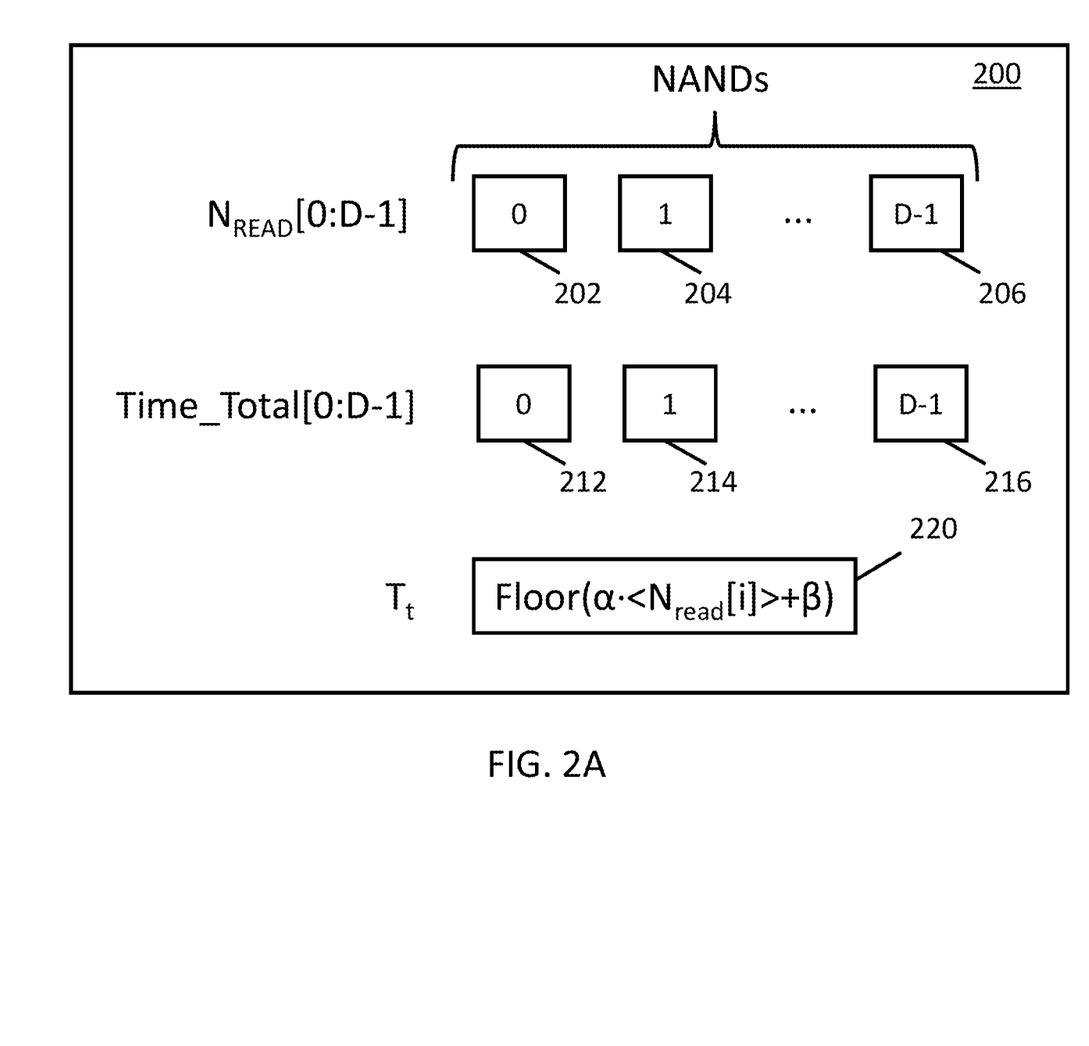
FIGS. 2A, 2B, and 2C show examples of values that can be tracked in accordance with some embodiments.
Figure 2B:
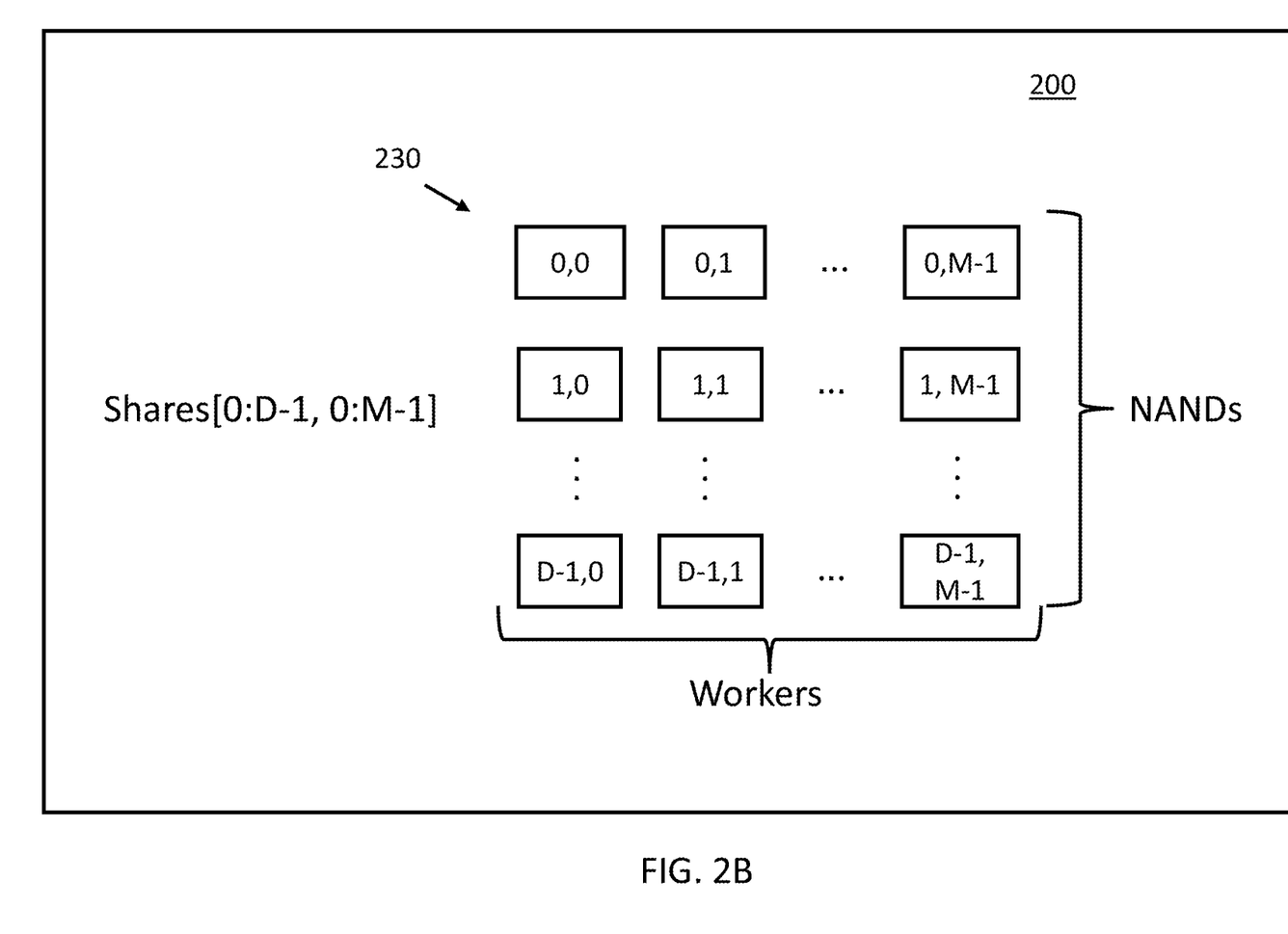
Figure 2C:
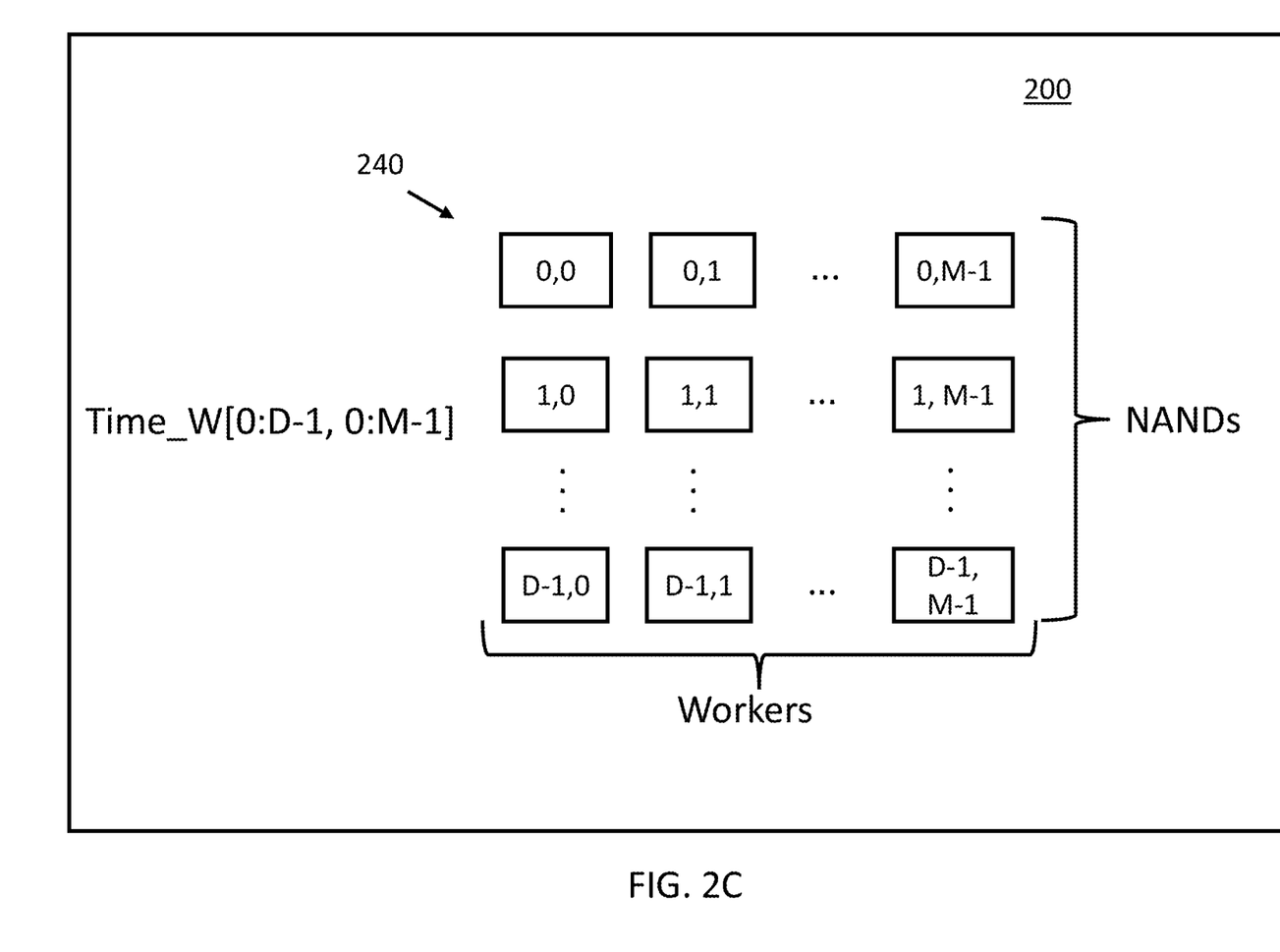

Turning to FIGS. 2A, 2B, and 2C, examples of values 200 that can be tracked in accordance with some embodiments are illustrated.

As shown in FIG. 2A, in some embodiments, these values can include counts of incomplete read commands for each portion of the storage device (e.g., each NAND in the solid-state drive of FIG. 1) $N_{read}[0:N-1]$ 202, 204, and 206. While three values $N_{read}[0:N-1]$ 202, 204, and 206 are shown in FIG. 2A, any suitable number (including only one) of these values can be tracked in some embodiments.

As also shown in FIG. 2A, in some embodiments, these values can include a total time of all workers on each portion of the storage device (e.g., each NAND in the solid-state drive of FIG. 1) Time_Total[0:N−1] 212, 214, and 216. This total time of all workers can be represented in any suitable manner. For example, in some embodiments, this total time can be expressed as a real value of seconds (e.g., 10.02 ms or any other suitable value). As another example, in some embodiments, this total time can be expressed as any suitable integer units of time (which can be a rounded value from a real value, in some embodiments). While three values Time_Total[0:N−1] 212, 214, and 216 are shown in FIG. 2A, any suitable number (including only one) of these values can be tracked in some embodiments.

As further shown in FIG. 2A, in some embodiments, these values can include a threshold Tt 220 that can be used to prioritize read commands for that portion of the storage as described herein. Threshold Tt 220 can be common across all portions of a storage device (e.g., NANDs) and workers in some embodiments. While Tt 220 can be equal to floor $(\alpha \cdot <N_{read}[i]> + \beta)$ in some embodiments, in other embodiments, Tt 220 can be based on ceiling$(\alpha \cdot <N_{read}[i]> + \beta)$, int$(\alpha \cdot <N_{read}[i]> + \beta)$, $(\alpha \cdot <N_{read}[i]> + \beta)$, or any other suitable function based on $<N_{read}[i]>$, where: floor ( ) returns the greatest integer less than or equal to a real input value; ceiling ( ) returns the least integer greater than or equal to a real input value; and int ( ) returns the greatest integer less than or equal to a real input value, $<N_{read}[i]>$ is the average number of incomplete read commands across all portions (e.g., NANDs) of the storage device; and $\alpha$ and $\beta$ are calibration parameters that can be determined heuristically based on a desired aggressiveness of the mechanisms in prioritizing read commands.

As shown in FIG. 2B, in some embodiments, values 200 can also include, for each combination of: a portion (0:D−1) of the storage device (e.g., each NAND in the solid-state drive of FIG. 1); and worker (0:M−1), an allocated share value Shares [0:D−1,0:M−1] 230, which can be expressed as a percentage and the total of the shares for all workers on any given portion of the storage device totals 100%. While nine values Shares [0:D−1,0:M−1] 230 are shown in FIG. 2B, any suitable number (including only one) of these values can be tracked in some embodiments.

As shown in FIG. 2C, in some embodiments, values 200 can further include, for each combination of: a portion (0:D−1) of the storage device (e.g., each NAND in the solid-state drive of FIG. 1); and worker (0:M−1), a total time Time_W[0:D−1,0:M−1] 240 for the worker on the portion of the storage device. This total time can be represented in any suitable manner. For example, in some embodiments, this total time can be expressed as a real value of seconds (e.g., 10.02 ms or any other suitable value). As another example, in some embodiments, this time can be expressed as any suitable integer units of time (which can be a rounded value from a real value in some embodiments). While nine values Time_W[0:D−1,0:M−1] 240 are shown in FIG. 2C, any suitable number (including only one) of these values can be tracked in some embodiments.

The values in FIGS. 2A, 2B, and 2C can be stored in any suitable location in some embodiments. For example, in some embodiments, these values can be stored in RAM 118 of FIG. 1.

Figure 3:
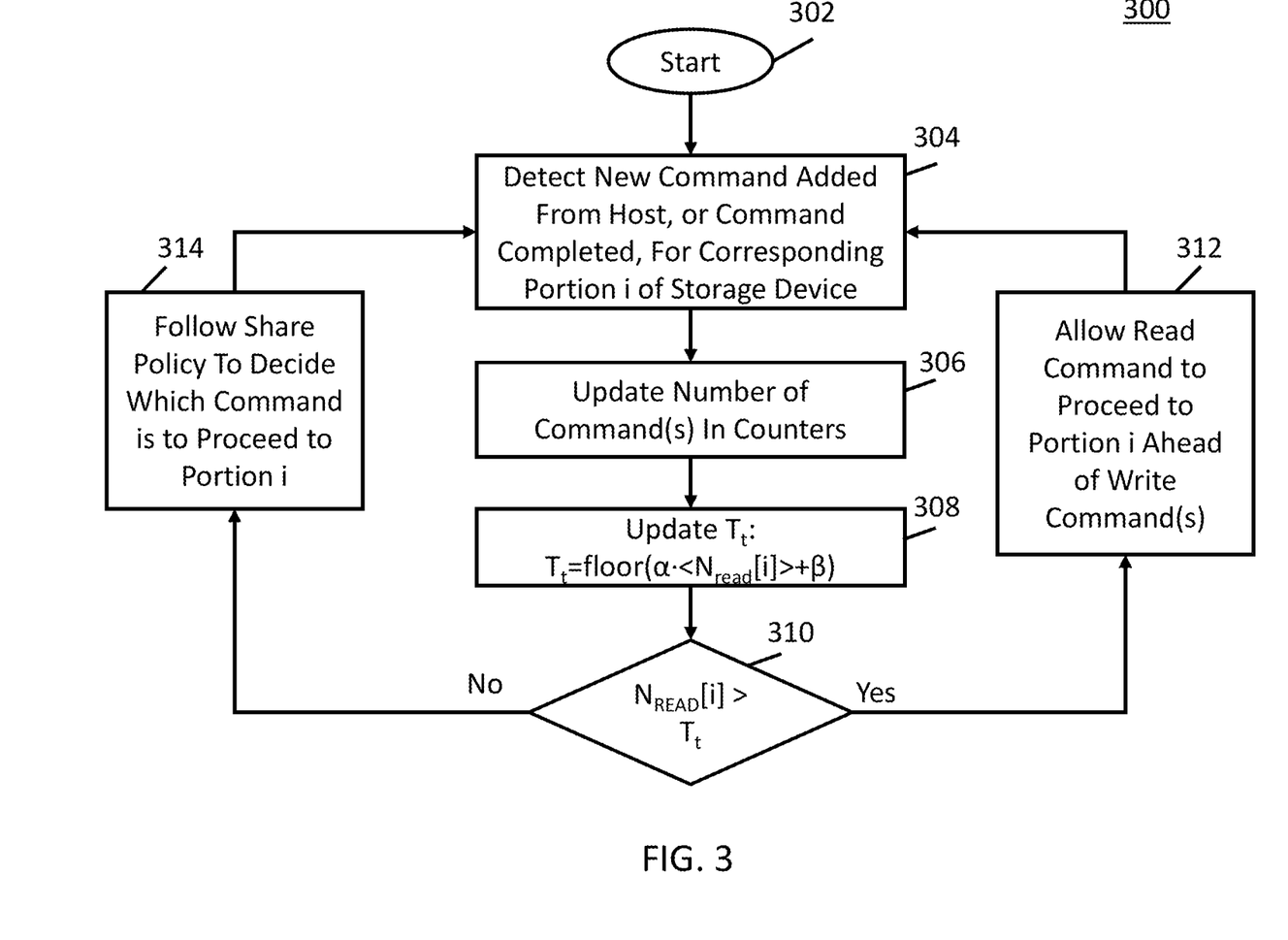
FIG. 3 is an example of a process for prioritizing read commands in accordance with some embodiments.

Turning to FIG. 3, an example 300 of a process for prioritizing read commands in accordance with some embodiments is shown. This process can be performed on any suitable device. For example, in some embodiments, this process can be performed on a controller of a storage device (e.g., such as controller 104 of FIG. 1). In accordance with some embodiments, a different instance of this process can be executed for each portion i of a storage device (e.g., each NAND device 106, 108, and 110 on solid-state drive 102).

As illustrated, after an instance of process 300 for portion i begins at 302, at 304, the process can detect that a new command has been added from the host, or that a command has been completed, for portion i. The process can detect that a new command has been added from the host, or that a command has been completed, in any suitable manner. For example, in some embodiments, the process can detect that a new command has been added from the host by detecting a new command being added to a queue for portion i of the storage device. As another example, in some embodiments, the process can detect that a command has been completed by detecting a command has been removed from a queue for portion i of the storage device.

Next, at 306, if the process added or completed is a read command, process 300 can update the number of commands in counters $N_{read}[i]$ based on the detection at 304. This update can be performed in any suitable manner in some embodiments. For example, in some embodiments, this update can be performed by adding one to a value in a memory location corresponding to $N_{read}[i]$.

Then, at 308, process 300 can update threshold $T_t$ based on the following equation:

$$T_t = \text{floor}(\alpha \cdot <N_{read}[i]> + \beta)$$

where: floor ( ) returns the greatest integer less than or equal to a real input value; $<N_{read}[i]>$ is the average number of incomplete read commands across all portions (e.g., NANDs) of the storage device; and $\alpha$ and $\beta$ are calibration parameters that can be determined heuristically based on a desired aggressiveness of the mechanism in prioritizing read commands. $\alpha$ and $\beta$ can have any suitable values in some embodiments. For example, in some embodiments, a can be any suitable value between 0.5 and 1.5 (e.g., 1.0) and $\beta$ can be any suitable non-negative integer value (e.g., 0, 1, 2, 3, etc.).

In some embodiments, rather than using a floor function as shown above, a ceiling function or an int function can be used as follows:

$$T_t = \text{ceiling}(\alpha \cdot <N_{read}[i]> + \beta)$$

$$T_t = \text{int}(\alpha \cdot <N_{read}[i]> + \beta),$$

wherein: ceiling ( ) returns the least integer greater than or equal to a real input value; int ( ) returns the greatest integer less than or equal to a real input value; $<N_{read}[i]>$ is the average number of incomplete read commands across all portions (e.g., NANDs) of the storage device; and $\alpha$ and $\beta$ are calibration parameters that can be determined heuristically based on a desired aggressiveness of the mechanisms in prioritizing read commands.

In some embodiments, the floor function can be omitted as follows:

$$T_t = \alpha \cdot <N_{read}[i]> + \beta$$

At 310, process 300 can determine whether the number of incomplete read commands for portion $i(N_{read}[i])$ meets (e.g., is greater than or greater than or equal to) threshold $T_t$. This determination can be made in any suitable manner. For example, in some embodiments, this determination can be determined by comparing a first value in a memory location corresponding to $N_{read}[i]$ to a second value in a memory location corresponding to T t to determine if the first value is greater than, or greater than or equal to, the second value.

If it is determined at 310 that the number of incomplete read commands for portion i (e.g., NAND[i]) ($N_{read}[i]$) meets (e.g., is greater than or greater than or equal to) threshold $T_t$, then process 300 can branch to 312 at which it allows a read command to proceed to portion i (e.g., NAND[i]) ahead of one or more write commands in some embodiments. Allowing a read command to proceed to portion i (e.g., NAND[i]) ahead of one or more write commands can be performed in any suitable manner in some embodiments. For example, a next read command from the same or a different worker can be selected and sent to the portion i of the storage device ahead of waiting write commands in some embodiments.

Otherwise, if it is determined at 310 that the number of incomplete read commands for portion i (e.g., NAND[i]) ($N_{read}[i]$) does not meet (e.g., is less than or equal to, or less than) threshold $T_t$, then process 300 can branch to 314 at which it can follow a share policy to decide which command is to proceed to portion i (e.g., NAND[i]) in some embodiments. Following a share policy to decide which command is to proceed to portion i (e.g., NAND[i]) can be performed in any suitable manner (e.g., as described below in connection with FIG. 4) in some embodiments.

Figure 4:
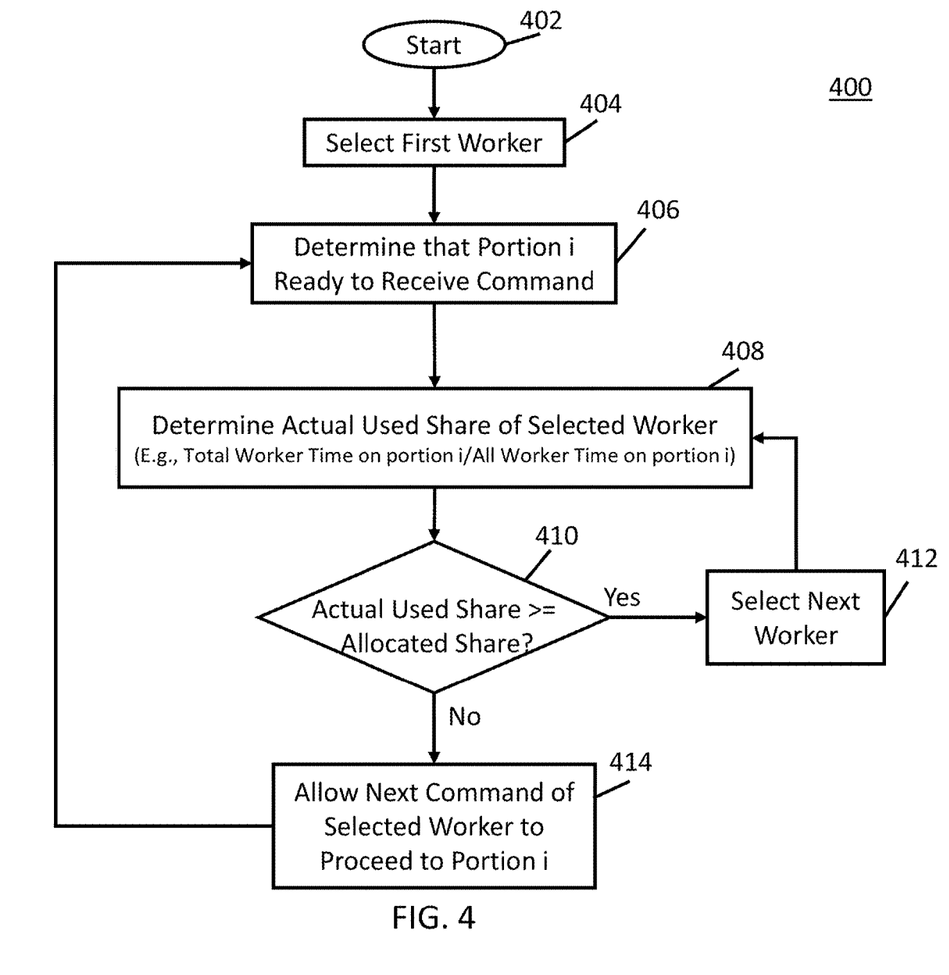
FIG. 4 is an example of a process for selecting a worker based on actual usage in accordance with some embodiments.

Turning to FIG. 4, an example 400 of a process for deciding which command is to proceed to a portion i of a storage device (e.g., NAND[i]) that can be used at 314 of FIG. 3 in accordance with some embodiments is shown. This process can be performed on any suitable device. For example, in some embodiments, this process can be performed on a controller of a storage device (e.g., such as controller 104 of FIG. 1). In accordance with embodiment some embodiments, a different instance of this process can be executed for each portion of a storage device (e.g., each NAND device 106, 108, and 110 on solid-state drive 102).

As illustrated, after process 400 begins at 402, the process can select a first worker. Any suitable worker can be selected as the first worker and this worker can be selected in any suitable manner, in some embodiments. For example, in some embodiments, the worker with oldest incomplete command can be selected as the first worker. As another example, a worker that was first instantiated can be selected as the first worker in some embodiments.

Next, at 406, process 400 can determine that portion i of the storage device (e.g., NAND[i]) is ready to receive a command. This determination can be made in any suitable manner in some embodiments. For example, in some embodiments, this determination can be made by checking a command queue of portion i to see if it is empty (which can indicate that portion i is ready to receive a command).

Then, at 408, process 400 can determine an actual used share of the selected worker. This determination can be made in any suitable manner in some embodiments. For example, in some embodiments, process 400 can determine an actual used share of the selected worker by dividing the total worker time on portion i (e.g., Time_W[i,w] 240, where w is the index of the selected worker) by the total time of all workers on portion i (e.g., Time_Total[i] 212, 214, or 216).

At 410, process 400 can next determine if the actual used share of the selected worker meets (e.g., is greater than, or greater than or equal to) the allocated share of the selected worker for the corresponding portion i (e.g., NAND[i]) (e.g., Shares[i,w] 230, where w is the index of the selected worker). This determination can be made in any suitable manner in some embodiments. For example, in some embodiments, process 400 can make this determination by comparing a first value in a memory location corresponding to the actual used share of the selected worker to a second value in a memory location corresponding to the allocated share of the selected worker for the corresponding portion i to determine if the first value is greater than, or greater than or equal to, the second value.

If it is determined at 410 that the actual used share of the selected worker meets (e.g., is greater than, or greater than or equal to) the allocated share of the selected worker for the corresponding NAND[i], then process 400 can select a next worker at 412. The next worker can be selected in any suitable manner. For example, in some embodiments, the worker with next oldest incomplete command compared to the currently selected worker can be selected as the next worker. As another example, a worker that was instantiated next after the currently selected worker can be selected as the first worker in some embodiments. After selecting the next worker at 412, process 400 can loop back to 408.

Otherwise, if it is determined at 410 that the actual used share of the selected worker does not meet (e.g., is less than, or less than or equal to) the allocated share of the selected worker for the corresponding portion i, then process 400 can allow the next command of the selected worker to proceed to portion i at 414 and then loop back to 406. Process 400 can allow the next command of the selected worker to proceed to portion i in any suitable manner in some embodiments. For example, in some embodiments, process 400 can process a command of the selected worker that is next in a command queue based on the parameters of the command.

In some embodiments, at least some of the above-described blocks of the processes of FIGS. 3 and 4 can be executed or performed in any order or sequence not limited to the order and sequence shown in and described in connection with the figures. Also, some of the above blocks of the processes of FIGS. 3 and 4 can be executed or performed substantially simultaneously where appropriate or in parallel to reduce latency and processing times in some embodiments. Additionally or alternatively, some of the above described blocks of the processes of FIGS. 3 and 4 can be omitted in some embodiments.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

As can be seen from the description above, new mechanisms (which can include systems, methods, and media) for prioritizing read accesses to storage devices are provided. By prioritizing read accesses when needed, these mechanisms can improve the QoS performance of storage devices and thereby improve the performance of host devices connected to the storage devices.

While various embodiments are described herein as prioritizing read commands over write commands, these types of commands are described herein merely for purposes of illustration and not of limitation. In some embodiments, other types of commands can be substituted for each of the read commands and the write commands described herein. For example, one type of command can be prioritized over one or more other type(s) of commands based on the time each takes to execute (e.g., faster commands are prioritized over slower commands), based on any suitable importance indicated for the types of commands (e.g., more important commands are prioritized over less important commands), based upon how the types commands affect a QoS of storage device (e.g., types of commands the improve QoS are prioritized over commands that do not improve QoS), based upon an urgency of the types of commands (e.g., types of commands that are more urgent than one or more other types of commands can be prioritized), etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for prioritizing commands to a storage device, comprising:
   memory; and
   at least one hardware processor that is coupled to the memory and that is collectively configured to at least:
   determine counts of read commands targeting a plurality of portions of the storage device;
   calculate a threshold based on a function of an average of the counts of the read commands targeting the plurality of portions of the storage device, wherein meeting the threshold indicates that one or more read commands are to be prioritized over one or more write commands;
   determine that a count of read command(s) targeting one of the plurality of portions of the storage device meets the threshold; and
   in response to determining that the count of read command(s) targeting the one of the plurality of portions of the storage device meets the threshold, prioritize a first read command to access the one of the plurality of portions of the storage device over at least one write command by sending the first read command to the one of the plurality of portions of the storage device ahead of the at least one write command.

2. The system of claim 1, wherein the at least one hardware processor is also collectively configured to at least:

determine that a count of read command(s) targeting one of the plurality of portions of the storage device does not meet the threshold; and in response to determining that the count of read command(s) targeting the one of the plurality of portions of the storage device does not meet the threshold, not prioritize a second read command to access the one of the plurality of portions of the storage device over at least one write command.

3. The system of claim 1, wherein the plurality of portions of the storage device are NAND devices.

4. The system of claim 1, wherein the storage device is a solid-state drive.

5. The system of claim 1, wherein the function of the average of the counts of the read commands targeting the plurality of portions of the storage device is a function of $\alpha \cdot <N_{read}[i]> + \beta$, where $<N_{read}[i]>$ is the average of the counts of the read commands targeting the plurality of portions of the storage device, and $\alpha$ and $\beta$ are control parameters.

6. The system of claim 1, wherein the function of the average of the counts of the read commands targeting the plurality of portions of the storage device is floor($\alpha \cdot <N_{read}[i]> + \beta$), where $<N_{read}[i]>$ is the average of the counts of the read commands targeting the plurality of portions of the storage device, and $\alpha$ and $\beta$ are control parameters.

7. The system of claim 1, wherein the determining that the count of read command(s) targeting the one of the plurality of portions of the storage device meets the threshold comprises determining that the count of read command(s) targeting the one of the plurality of portions of the storage device is greater than the threshold.

8. The system of claim 1, wherein the determining that the count of read command(s) targeting the one of the plurality of portions of the storage device meets the threshold comprises determining that the count of read command(s) targeting the one of the plurality of portions of the storage device is greater than or equal to the threshold.

9. A method for prioritizing commands to a storage device, comprising:

determining counts of read commands targeting a plurality of portions of the storage device;

calculating a threshold based on a function of an average of the counts of the read commands targeting the plurality of portions of the storage device, wherein meeting the threshold indicates that one or more read commands are to be prioritized over one or more write commands;

determining that a count of read command(s) targeting one of the plurality of portions of the storage device meets the threshold; and in response to determining that the count of read command(s) targeting the one of the plurality of portions of the storage device meets the threshold, prioritizing a first read command to access the one of the plurality of portions of the storage device over at least one write command by sending the first read command to the one of the plurality of portions of the storage device ahead of the at least one write command.

10. The method of claim 9, further comprising:

determining that a count of read command(s) targeting one of the plurality of portions of the storage device does not meet the threshold; and in response to determining that the count of read command(s) targeting the one of the plurality of portions of the storage device does not meet the threshold, not prioritizing a second read command to access the one of the plurality of portions of the storage device over at least one write command.

11. The method of claim 9, wherein the plurality of portions of the storage device are NAND devices.

12. The method of claim 9, wherein the storage device is a solid-state drive.

13. The method of claim 9, wherein the function of the average of the counts of the read commands targeting the plurality of portions of the storage device is a function of $\alpha \cdot <N_{read}[i]> + \beta$, where $<N_{read}[i]>$ is the average of the counts of the read commands targeting the plurality of portions of the storage device, and $\alpha$ and $\beta$ are control parameters.

14. The method of claim 9, wherein the function of the average of the counts of the read commands targeting the plurality of portions of the storage device is floor($\alpha \cdot <N_{read}[i]> + \beta$), where $<N_{read}[i]>$ is the average of the counts of the read commands targeting the plurality of portions of the storage device, and $\alpha$ and $\beta$ are control parameters.

15. The method of claim 9, wherein the determining that the count of read command(s) targeting the one of the plurality of portions of the storage device meets the threshold comprises determining that the count of read command(s) targeting the one of the plurality of portions of the storage device is greater than the threshold.

16. The method of claim 9, wherein the determining that the count of read command(s) targeting the one of the plurality of portions of the storage device meets the threshold comprises determining that the count of read command(s) targeting the one of the plurality of portions of the storage device is greater than or equal to the threshold.

17. A non-transitory computer-readable medium containing computer executable instructions that, when executed by a processor, cause the processor to perform a method for prioritizing commands to a storage device, the method comprising:

determining counts of read commands targeting a plurality of portions of the storage device;

calculating a threshold based on a function of an average of the counts of the read commands targeting the plurality of portions of the storage device, wherein meeting the threshold indicates that one or more read commands are to be prioritized over one or more write commands;

determining that a count of read command(s) targeting one of the plurality of portions of the storage device meets the threshold; and in response to determining that the count of read command(s) targeting the one of the plurality of portions of the storage device meets the threshold, prioritizing a first read command to access the one of the plurality of portions of the storage device over at least one write command by sending the first read command to the one of the plurality of portions of the storage device ahead of the at least one write command.

18. The non-transitory computer-readable medium of claim 17, wherein the method further comprises:

determining that a count of read command(s) targeting one of the plurality of portions of the storage device does not meet the threshold; and in response to determining that the count of read command(s) targeting the one of the plurality of portions of the storage device does not meet the threshold, not prioritizing a second read command to access the one of the plurality of portions of the storage device over at least one write command.

19. The non-transitory computer-readable medium of claim 17, wherein the plurality of portions of the storage device are NAND devices.

20. The non-transitory computer-readable medium of claim 17, wherein the storage device is a solid-state drive.

21. The non-transitory computer-readable medium of claim 17, wherein the function of the average of the counts of the read commands targeting the plurality of portions of the storage device is a function of $\alpha \cdot \langle N_{read}[i] \rangle + \beta$, where $\langle N_{read}[i] \rangle$ is the average of the counts of the read commands targeting the plurality of portions of the storage device, and $\alpha$ and $\beta$ are control parameters.

22. The non-transitory computer-readable medium of claim 17, wherein the function of the average of the counts of the read commands targeting the plurality of portions of the storage device is floor($\alpha \cdot \langle N_{read}[i] \rangle + \beta$), where $\langle N_{read}[i] \rangle$ is the average of the counts of the read commands targeting the plurality of portions of the storage device, and $\alpha$ and $\beta$ are control parameters.

23. The non-transitory computer-readable medium of claim 17, wherein the determining that the count of read command(s) targeting the one of the plurality of portions of the storage device meets the threshold comprises determining that the count of read command(s) targeting the one of the plurality of portions of the storage device is greater than the threshold.

24. The non-transitory computer-readable medium of claim 17, wherein the determining that the count of read command(s) targeting the one of the plurality of portions of the storage device meets the threshold comprises determining that the count of read command(s) targeting the one of the plurality of portions of the storage device is greater than or equal to the threshold.

* * * * *